H. N. JOSLEYN.
TYPE WRITING MACHINE.
APPLICATION FILED JAN. 26, 1909.
919,020.
Patented Apr. 20, 1909.
5 SHEETS—SHEET 3.
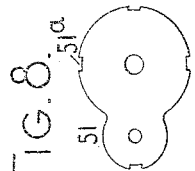
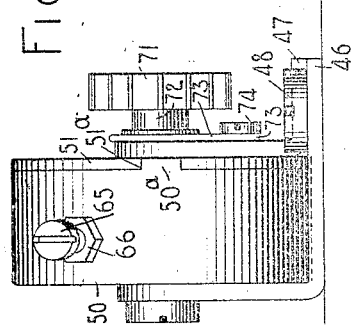
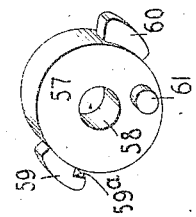
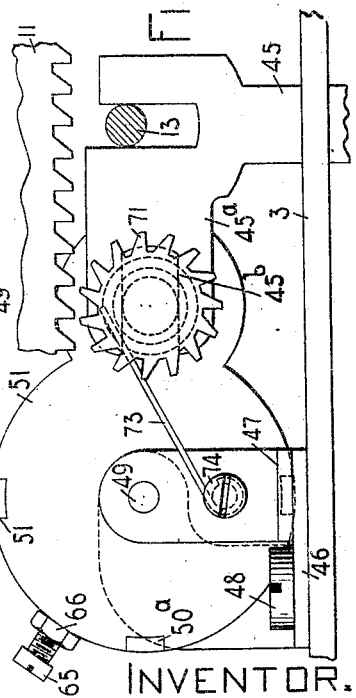
WITNESSES.
INVENTOR.
Hubbard N. Josleyn
By Jacob Felbel
HIS ATTORNEY

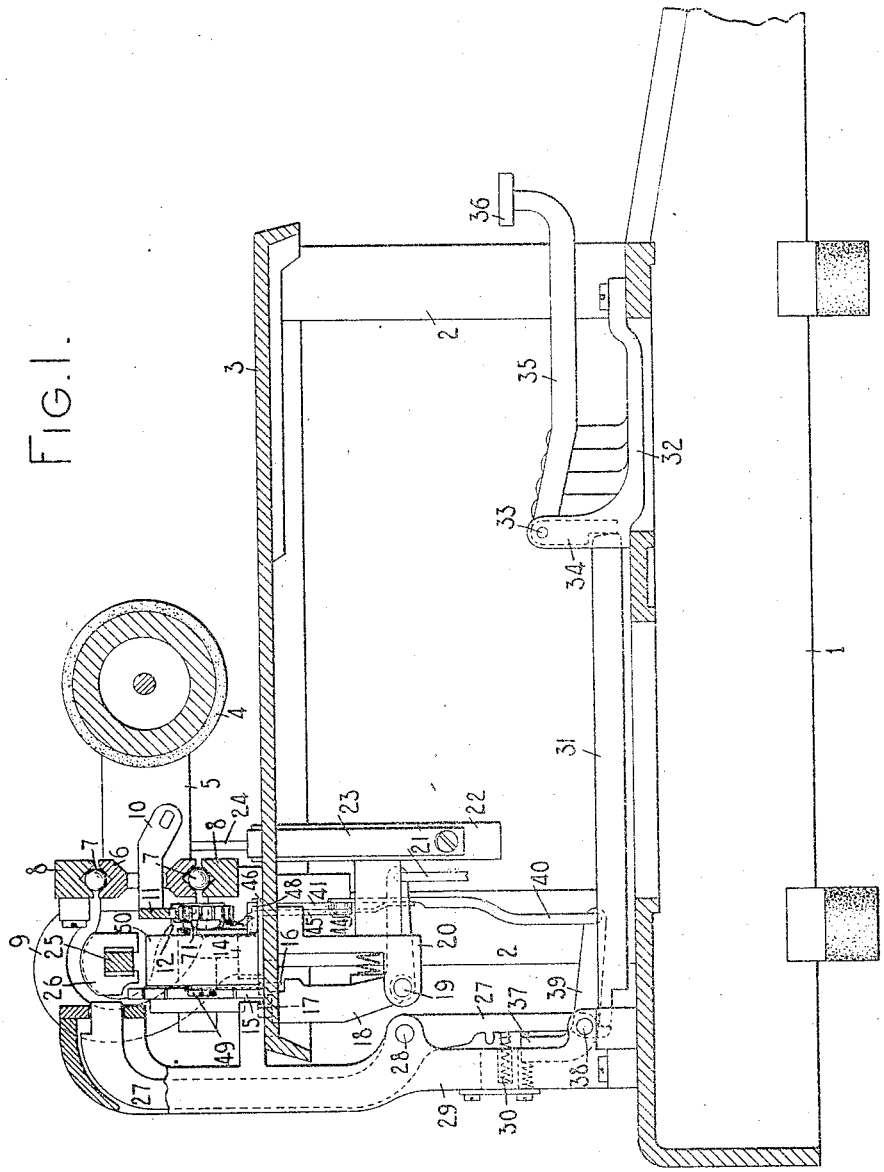

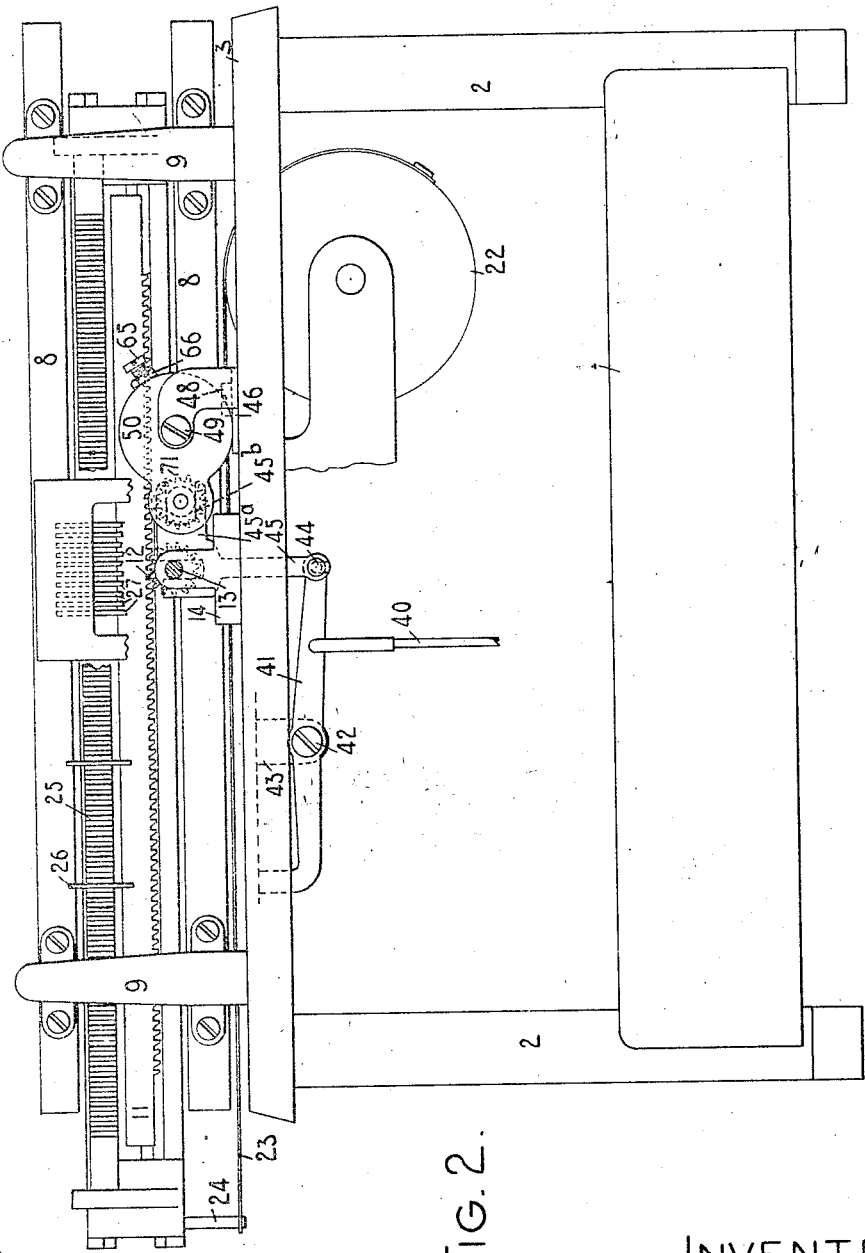

H. N. JOSLEYN.
TYPE WRITING MACHINE.
APPLICATION FILED JAN. 26, 1909.

919,020.

Patented Apr. 20, 1909.
5 SHEETS—SHEET 4.

WITNESSES:

INVENTOR:
Hubbard N. Josleyn
By Jacob Felbel
HIS ATTORNEY

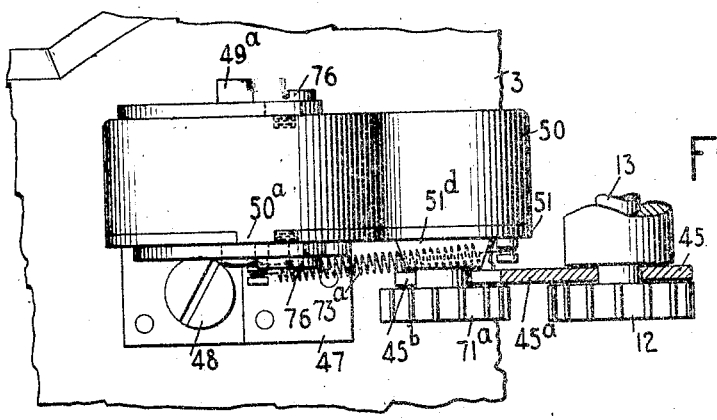
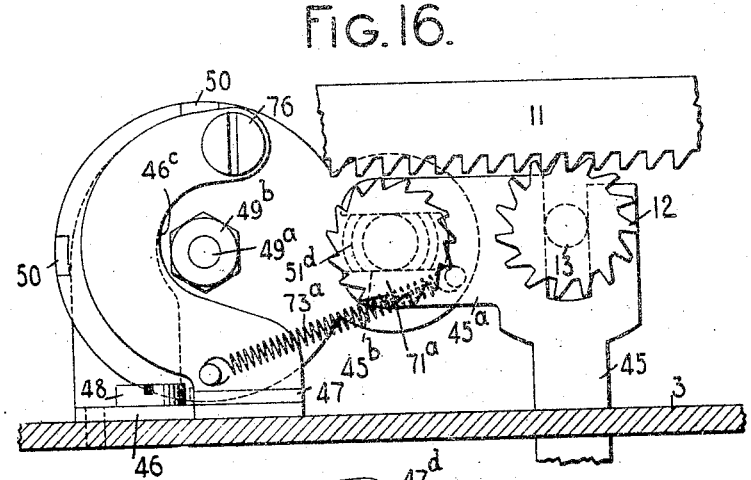
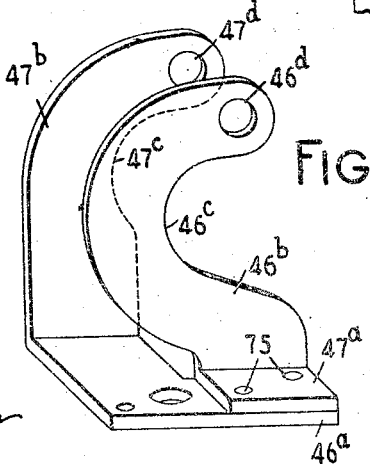

UNITED STATES PATENT OFFICE.

HUBBARD N. JOSLEYN, OF SYRACUSE, NEW YORK, ASSIGNOR TO THE MONARCH TYPEWRITER COMPANY, OF SYRACUSE, NEW YORK, A CORPORATION OF NEW YORK.

TYPE-WRITING MACHINE.

No. 919,020.  Specification of Letters Patent.  Patented April 20, 1909.

Application filed January 26, 1909. Serial No. 474,231.

*To all whom it may concern:*

Be it known that I, HUBBARD N. JOSLEYN, citizen of the United States, and resident of Syracuse, in the county of Onondaga and State of New York, have invented certain new and useful Improvements in Type-Writing Machines, of which the following is a specification.

My invention relates to retarding contrivances for typewriting machines and has for its main object to provide improved devices of the class specified.

To the above and other ends the invention consists in the features of construction, combinations of devices and arrangements of parts hereinafter described and particularly pointed out in the claims.

My invention is illustrated as applied to a Monarch typewriting machine but may be adapted to other styles of writing machines.

Said invention is designed as an improvement on the construction disclosed in the pending application of Jacob Felbel Serial No. 473,440, filed January 21st, 1909.

Figure 11:
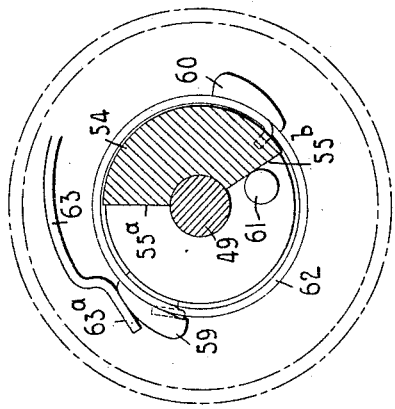
Figure 14:
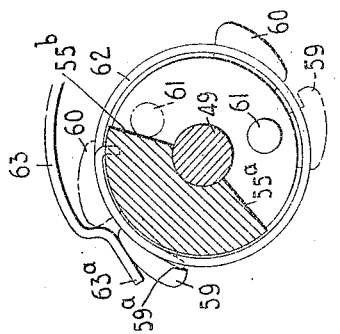
Figure 13:
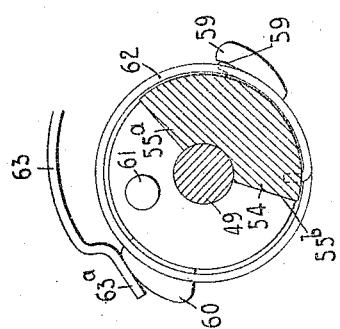
Figure 10:
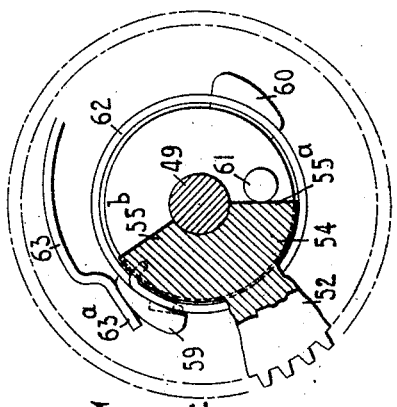
Figure 12:
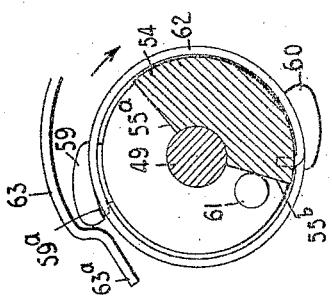

In the drawings, Figure 1 is a vertical longitudinal sectional view of a Monarch typewriting machine embodying my invention, parts of the machine being omitted and parts broken away. Fig. 2 shows the machine in rear elevation, parts being omitted and parts broken away. Fig. 3 is a side elevation of the retarder contrivance and its supporting bracket looked at from the right-hand side. Fig. 4 is a vertical sectional view of the retarder contrivance taken on a plane represented by the dotted line *x—x* in Fig. 5 and looking in the direction of the arrows at said line. Fig. 5 is a horizontal sectional view taken on a plane represented by the dotted line *y—y* in Fig. 4 and looking in the direction of the arrows at said line. Fig. 6 is a front elevation of the retarder contrivance and its mounting, part of the carriage rack also being shown, as well as the lifting device for the retarder. Figs. 7, 8 and 9 are detail views of different parts of the retarder contrivance. Fig. 10 is an operating view taken on a plane represented by the dotted line *z—z* in Fig. 5 and looking in the direction of the arrows at said line, some parts shown in Fig. 5 being omitted from Fig. 10, the scale whereof is somewhat larger than that of Fig. 5. Fig. 11 is a view corresponding with Fig. 10 but showing the parts in different relations. Figs. 12, 13 and 14 are operating views illustrating different relations of certain of the retarding devices at different stages of the operation of the retarding contrivance, said figures corresponding to Fig. 10 but being drawn to a smaller scale. Fig. 15 is a top plan view of a modified retarder contrivance embodying several changes in construction over the Figs. 1—14 form. Fig. 16 is a front view of the modified contrivance shown in Fig. 15. Fig. 17 is a perspective view of the supporting bracket shown in Figs. 15 and 16.

Referring first to Figs. 1 and 2, the base 1 has rising from it corner posts 2 which support a top plate 3, these parts constituting the main frame of the machine. Type bars and their actuating devices (not shown) are mounted on the main frame, said type bars coöperating with a platen 4 mounted on a carriage composed of end bars 5 and a slide bar 6. The slide bar is grooved at its top and bottom faces to coöperate with bearing balls 7 which also coöperate with grooved guide rails 8 secured to curved standards 9. Arms 10 pivoted on the end bars of the carriage carry a spring-pressed feed rack 11 which normally meshes with a feed pinion 12 fixed to the front end of a horizontal shaft 13 journaled on a bracket 14. An escapement wheel 15 is operatively connected with the shaft and coöperates with feed dogs 16 and 17 supported on a dog rocker 18 pivoted at 19 on a bracket 20. A link 21 connects the dog rocker with a universal bar (not shown) which is operated by the key levers. A spring drum 22 contains the usual main spring and is connected by a strap 23 with a pin 24 depending from the carriage. The main spring tends constantly to draw the carriage leftward over the top plate, the carriage movements in this direction, however, being usually controlled by the operation of the escapement devices during the printing or spacing of the different characters as the lines are written.

The drawings illustrate a tabulator mechanism like that disclosed in the patent to Felbel, No. 904,689, granted November 24, 1908. A toothed stop bar 25 mounted at the rear of the carriage receives adjustable column stops 26 which are adapted to co-act with a set of denomination stops at the upper forwardly extending ends of a series of levers 27 pivoted at 28 on a frame 29 detachably secured to the main frame of the machine.

Coiled springs 30 coöperate with the lower arms of the stop levers to maintain the stopping portions thereof normally out of the path of the column stops. Operative on the lower end of each lever 27 is a slide bar 31 mounted to slide in fixed guide ways. Webs or brackets 32 suitably secured to the frame of the machine provide bearings for rock shafts 33, one only of which is shown. Fixed to each rock shaft is a downwardly extending arm 34 arranged to coöperate with the forward end of one of the slide bars 31. Each rock shaft has fixed to it also a tabulator lever 35 provided with a key 36.

When any tabulator key 36 is operated it turns its rock shaft 33, causing the arm 34 fixed thereto to push the associate slide bar 31 rearward, said slide bar actuating one of the denomination levers 27 to bring the stop portion at the upper end of said lever into the path of the column stops 26. A universal bail 37 operative by the levers 27 to actuate the carriage releasing mechanism is pivoted at 38 on the frame 29. The bail has an extension 39 which is pivotally connected with the lower end of an upwardly extending link 40 which is pivotally connected at its upper end to one arm of a lever 41 fulcrumed at 42 in a bracket 43. The same arm of the lever 41 pivotally supports at 44 a lifting device 45 which is bifurcated at its upper end to embrace loosely the shaft 13 through cut-outs in the bracket 14. In the patented construction the bifurcated upper end portions of the lifting device 45 are provided with lifting shoes, but these lifting shoes are dispensed with in the present case and the lifting device is formed instead with a lateral extension 45ª which has a horizontal slot 45ᵇ, which slot connects the lifting device with the retarder contrivance so that the release of the carriage may be effected by the same operation which connects the retarder contrivance with said carriage.

The retarder contrivance devised by me in the present case is an improvement on the intermittent retarder contrivance disclosed in the pending application of Jacob Felbel hereinbefore referred to.

The contrivance as a whole is pivotally supported on a bracket which as best shown in Figs. 3, 4 and 5 is composed of two right-angled plates 46 and 47. The plate 47 has a horizontal arm which rests on a corresponding horizontal arm of the plate 46, the two plates being suitably secured together as by brazing and being fixed to the top plate 3 by a headed screw 48 which passes through a hole in the bottom plate 46. The upstanding arms of the plates 46 and 47 are spaced apart to receive between them the retarder contrivance which is pivotally mounted on a headed and shouldered screw 49. Said screw, as appears in Fig. 5, engages holes in said upstanding arms, the opening in the plate 47 being threaded to receive the reduced and threaded end portion of the screw 49. The casing which contains the retarder devices consists of a box-like part 50 and a cover plate 51 therefor. As will be understood from an examination of Figs. 3, 4 and 5, the box 50 is composed of two circular connecting chambers, one somewhat larger than the other. The cover plate 51 is of corresponding shape in plan, as shown in Fig. 8, and is formed with notches 51ª which are adapted to receive corresponding lugs 50ª projecting from the edge of the box 50 giving a sort of dove-tail construction such that when the box and its cover are secured together by the screw 49 the cover is prevented from accidentally slipping off sidewise.

Before the casing is assembled and mounted in place on its supporting bracket, various devices comprised in the retarding mechanism are arranged in the box-like part 50, and their construction and arrangement will be clearly understood by reference to Figs. 4 to 8 inclusive in connection with the following description. A gear wheel 52 is arranged in the larger circular chamber forming part of the box 50, said gear wheel being adapted to contact with a thin boss 51ᵇ formed on the inner face of the cover plate 51, this construction being provided to prevent the entire face of the gear wheel 52 from frictionally engaging with the inner face of the cover plate 51. At the opposite side from the boss 51ᵇ the gear wheel is provided with a hub 54 cut away at 55 to form two shoulders 55ª and 55ᵇ. The gear 52 is formed with a hole 56 through which the pivot screw 49 passes, thus adapting the gear wheel to rotate on said screw. A rotary checking device or cam carrier in the form of a sleeve 57 is formed with a central bearing opening 58 through which the pivot screw 49 passes, the sleeve being confined between the hub 54 and a thin boss 50ᵇ formed inside the box 50 on the bottom face thereof.

The sleeve 57 carries on its periphery two oppositely disposed checking devices or cams 59 and 60, the outer face of each cam gradually curving away from the center of rotation of the sleeve. A pin 61 on the sleeve 57 enters the cut-out 55 in the hub 54 and being adapted to operatively engage either of the shoulders 55ª and 55ᵇ. Normally the pin 61 is maintained in contact with the shoulder 55ª by a wire spring 62 which is coiled around the hub 54 and has one end secured in a hole in said hub, the other end of the spring being formed into a hook to engage a cut-away 59ª in the cam 59. Ordinarily the spring 62 will maintain the engaging devices 61 and 55ª in contact so that when the gear 52 is turned the sleeve 57 will be turned with said gear; but when the sleeve is checked or arrested the spring 62 permits the gear to be turned relatively to the sleeve and independently thereof, winding up the spring 62 until the shoulder 55ᵇ is brought into contact with the pin 61, after which the sleeve 57 will be forced to turn with the gear 52. Coöperative with the cams 59 and 60 is a checking device in the form of a circular leaf spring 63 which is arranged within the larger circular end of the box 50. One end of the spring 63 is suitably secured as by rivets 64 to the inner wall of the box and the opposite end is bent or doubled back on itself and then curved inward to provide a contact portion or tongue 63ᵃ with which the cams 59 and 60 may be caused to coöperate. A screw 65 passes through and is supported on the box 50, the inner end of the screw 65 contacting with the circular part of the spring 63 some distance from its free end. By screwing in the screw 65 and setting it by the nut 66 the pressure or checking effect exerted by the spring tongue 63ᵃ on the cams 59 and 60 may be increased. Conversely the checking effect may be lessened by unscrewing the screw 65, permitting the circular portion of the spring 63 to approach closer to the inner wall of the box 50. The operation of the checking devices 63ᵃ, 59 and 60 will be explained more fully later on.

The gear wheel 52 is adapted to be connected with the carriage to receive motion therefrom when the latter is released, by a train of devices which includes a smaller gear wheel 67 having a hub 68 and being fixed to a shaft 69 by a pin 70 passing transversely through said hub and shaft. The gear 67 and its hub are confined between a thin boss 51ᶜ on the inner face of the cover plate 51 and a thicker boss 50ᶜ integral with the box 50. The gear 67 and the shaft 69 are thus held from endwise motion but may turn freely when actuated. The shaft 69 projects forward outside a bearing boss 51ᵈ on the cover plate 51 and carries a toothed wheel or pinion 71 having a hub 72 by which said pinion is suitably secured to the shaft 69. The pinion 71 underlies the feed rack 11 and is normally maintained separated therefrom by devices which include a wire restoring spring 73 one end of which is secured by a screw 74 to the bracket arm 47, the free end of the spring engaging the boss 51ᵈ.

In assembling the parts, the bracket is secured to the top plate by the screw 46, the hub 72 being first arranged in the slot 45ᵇ in the lifting device 45. When a tabulator key 36 is depressed, the associate stop lever 27 will be projected into the path of the column stops 26 and at the same time the universal bar 37 will be moved rearward, raising the link 40 and causing the lifting device to be raised, thereby swinging the retarding contrivance on its pivot 49 and bringing the pinion 71 into engagement with the feed rack 11, thus connecting the retarding contrivance with the carriage. Thereafter as the upward movement of the pinion 71 is continued the feed rack 11 will be disengaged from the feed pinion 12, thus freeing the carriage and permitting it to be drawn leftward until arrested by the tabulator stops. As the carriage starts to run leftward its motion will be transmitted by the pinion 71 and gear 67 to the gear 52 and its hub 54. The hub 54 in turn causes rotation of the sleeve 57 and the cams thereon. It may be assumed that at the start the parts will be in the relations shown in Figs. 4 and 10 which are views from opposite sides, Fig. 10 illustrating the parts as viewed from the front. The spring 63 is considerably stronger than the spring 62 so that with the cam 59 in engagement with the spring tongue 63ᵃ the sleeve 57 will be momentarily held from turning although the spring 62 be urging it ahead. The rotary movement of the wheel 52 will cam the shoulder 55ᵃ to separate from the pin 61 and wind up the spring 62 until the shoulder 55ᵇ contacts with the pin 61, as shown in Fig. 11. Up to this time the leftward movement of the carriage has been substantially free and unobstructed and said carriage has consequently acquired considerable momentum. The extent of the free movement, of course, depends on the proportioning and arrangements of the parts as well as on the position of rest from which the retarding devices start.

After the shoulder 55ᵇ contacts with the pin 61 as shown in Fig. 11 the sleeve 57 will be forced to turn and the cam 59 will be forced past the spring check 63ᵃ. The parts will then be in the relationships shown in Fig. 12. As soon as the cam 59 is free from the spring tongue 63ᵃ, the spring 62 will operate to turn the sleeve 57 forward or in the direction of the arrow in Fig. 12 until said sleeve is arrested by the engagement of the cam 60 with the spring tongue 63ᵃ as shown in Fig. 13. As the sleeve turns, the gear wheel 52 and its hub 54 will be advanced to some extent because of their connection with the carriage which is also advancing; but no attempt has been made to show the extent of said advance in Fig. 13. When the independent advance of the sleeve 57 has been ended by the engagement of the cam 60 with the spring end 63ᵃ, said sleeve will remain substantially quiescent until the advance of the gear wheel 52 brings the shoulder 55ᵇ into contact with the pin 61 on said sleeve. Thereafter the sleeve 57 will be forced ahead by the hub 54 until the cam 60 has been forced past the spring tongue 63ᵃ and has reached the dotted line position shown in Fig. 14. The spring 63, of course, yields to permit the cam 60 to be forced past. As soon as the cam 60 is clear of the spring tongue 63ª, the sleeve 57 will be advanced independently by the spring 62 until arrested by the engagement of the cam 59 with the spring tongue 63ª as shown by full lines in Fig. 14. The sleeve will then remain quiescent until it is again forced ahead by the engagement of the shoulder 55ᵇ with the pin 61, provided the movement of the carriage prior to its arrest by the tabulator stops continues far enough to permit of such engagement and forcing ahead.

When the carriage is finally arrested one or the other of the cams 59 and 60 will be engaged with the spring end 63ª. If, when the arrest takes place, the spring 62 has been wound up to any extent by the independent advance of the sleeve 57, said spring 62 will unwind when the tabulator key is released and the retarder contrivance is disconnected or separated from the carriage. The end of said spring which is connected with the sleeve 57 will at this time be fixed by reason of the engagement of one of the cams with the spring end 63ª. Consequently the spring 62 will unwind from its other end, turning the hub 54, gear 52, gear 67 and pinion 71 in reverse direction until the abnormal tension in the spring 62 is entirely taken out and the spring is in its normal condition, at which time the shoulder 55ª will be in contact with the pin 61. It will be seen that the spring 62 is a double acting one and that at one time it operates to move or turn the device with which it is connected at one end while at another time said spring will operate to move or turn the device with which it is connected at its opposite end.

Various changes may be made within the scope of my present invention. Examples of such changes are shown in the modified construction illustrated in Figs. 15 to 17. It was found desirable to raise the pivotal center about which the retarder contrivance turns in order to facilitate the connection with and disconnection from the carriage of the retarder contrivance. Other changes to bring about this improved result consist first in the replacing of the restoring spring 73 by a coiled wire restoring spring 73ª, the ends of which are secured one to a pin on the retarder and the other to a pin on the supporting bracket; and second, in the replacing of the toothed wheel or pinion 71 by a pinion 71ª, the teeth whereof are shallower or less deeply cut than those of the pinion 71. The alterations necessitated by raising the pivotal center of the retarder contrivance include the replacing of the screw 49 by a headed screw 49ª, the latter screw being the shorter and terminating in a reduced and threaded end which extends outside the cover plate 51 and receives a nut 49ᵇ. The nut when tightened secures the cover plate to the body of the casing and maintains the screw 49ª in a fixed relationship with the casing. The supporting bracket of the first form is replaced by a supporting bracket 70 somewhat differently shaped as illustrated clearly in Fig. 17. The modified supporting bracket comprises two angled plates 46ª and 47ª which may be suitably secured together as by soldering or by pins 75 or by both; or, if preferred, the bracket may be formed of a single piece of sheet metal punched and bent to the proper shape. The horizontal portion of the plate 47ª rests on the corresponding portion of the plate 46ª, and the vertically disposed arms 46ᵇ and 47ᵇ are spaced apart to receive between them the retarder contrivance, as in the first construction. But in the modified form the upright arms 46ᵇ and 47ᵇ are curved or recessed as indicated at 46ᶜ and 47ᶜ to receive respectively the nut 49ᵇ and the head of the screw 49ª. At their upper ends said arms are formed with bearing openings 46ᵈ and 47ᵈ which receive shouldered screws 76. The shouldered portions of these screws turn in said bearing openings while the reduced and threaded ends of the screws engage tapped openings in the casing. The construction is such that the screws 76 are screwed in fixed relationship with the casing and provide bearings therefor which are somewhat like trunnions. When the retarder contrivance is raised and lowered to bring the pinion 71ª into engagement with the feed rack 11 and to disengage said pinion from said feed rack, the parts, owing to the raising of the center of movement, are adapted to engage and disengage more readily than in the prior construction, the disengagement being facilitated by the shallowness of the teeth of the pinion 71ª and also by the coiled spring 73ª, the power of which is employed more advantageously than was the power of the corresponding spring in the prior construction.

Various changes besides those described may be made without departing from my invention.

What I claim as new and desire to secure by Letters Patent, is:—

1. A retarder contrivance for typewriting machines comprising a rotary sleeve, a cam thereon, the outer face whereof is bounded by a curved surface the distance of which from the center of rotation of the sleeve gradually increases from one end of the cam to the other, and a checking spring engageable by the curved outer face of said cam.

2. A retarder contrivance for typewriting machines comprising a rotary sleeve, a cam thereon, the outer face whereof is bounded by a curved surface the distance of which from the center of rotation of the sleeve gradually increases from one end of the cam to the other, a checking spring engageable by the curved outer face of said cam, and a yielding spring connection between said sleeve and the carriage of the machine.

3. A retarder contrivance for typewriting machines comprising a rotary sleeve, a cam thereon having a curved outer face, and a checking spring, said spring being circularly curved and then bent back on itself to provide a tongue directly engageable by said cam.

4. A retarder contrivance for typewriting machines comprising a casing, a rotary sleeve therein, a cam on said sleeve having a curved outer face, a checking spring secured in the casing, said spring being circularly curved and then bent back on itself to provide a tongue directly engageable by said cam, and a tension regulating device on the casing for said spring comprising a screw and check nut.

5. In a typewriting machine, the combination of a retarder contrivance comprising a casing composed of a box and cover plate, a screw and a coöperating nut for securing the cover plate to the casing, said screw also serving as a pivot for certain retarder devices contained within the casing, and a supporting bracket comprising upright arms spaced apart to receive the retarder contrivance between them, said arms being provided with bearing openings engageable by shouldered screws carried by said casing.

6. In a typewriting machine, the combination of a retarder contrivance comprising a casing composed of a box and cover plate, a screw and a coöperating nut for securing the cover plate to the casing, said screw also serving as a pivot for certain retarder devices contained within the casing, and a supporting bracket comprising upright arms spaced apart to receive the retarder contrivance between them and each provided with a recess, one recess receiving the head of said screw and the other recess receiving said coöperating nut, said casing being pivoted on the upper ends of said upright arms.

7. In a typewriting machine, the combination of a retarder contrivance comprising a casing composed of a box and cover plate, a screw and a coöperating nut for securing the cover plate to the casing, said screw also serving as a pivot for certain retarder devices contained within the casing, and a supporting bracket comprising upright arms spaced apart to receive the retarder contrivance between them and each provided with a recess, one recess receiving the head of said screw and the other recess receiving said coöperating nut, said upright arms being formed at their upper ends with bearing openings which receive shouldered screws secured at opposite sides of said casing.

8. In a typewriting machine, the combination of a retarder contrivance comprising a casing composed of a box and cover plate, a screw and a coöperating nut for securing the cover plate to the casing, said screw also serving as a pivot for certain retarder devices contained within the casing, and a supporting bracket comprising upright arms spaced apart to receive the retarder contrivance between them, said arms being provided with bearing openings receiving shouldered screws carried by said casing, and a coiled restoring spring having one end secured to said bracket and the other end to said casing.

9. In a typewriting machine having escapement devices comprising a feed rack, the combination of a retarder contrivance comprising a casing composed of a box and cover plate, a screw and a coöperating nut for securing the cover plate to the casing, said screw also serving as a pivot for certain retarder devices contained within the casing, a supporting bracket comprising upright arms spaced apart to receive the retarder contrivance between them, said arms being provided with bearing openings engageable by shouldered screws carried by said casing, a pinion outside the casing and supported thereby, said pinion having comparatively shallow teeth and being coöperative with said feed rack, connections including a shaft between said pinion and the retarder devices within the casing, and a key-controlled lifting device formed with a slotted extension engaging said shaft.

Signed at Syracuse, in the county of Onondaga, and State of New York, this 22nd day of January A. D. 1909.

HUBBARD N. JOSLEYN.

Witnesses:
H. H. STEELE,
BERTHA HOUSE.